United States Patent [19]

Knuchel et al.

[11] Patent Number: 4,877,055
[45] Date of Patent: Oct. 31, 1989

[54] LEAKAGE DEVICE FOR THE DRAINAGE OF A DIAPHRAGM ACCUMULATOR

[75] Inventors: Pierre Knuchel, Germigny L'Eveque; Jacques Nollez, Paris, both of France

[73] Assignee: Bendix France, Drancy, France

[21] Appl. No.: 294,081

[22] Filed: Jan. 9, 1989

[30] Foreign Application Priority Data

Feb. 5, 1988 [FR] France .................. 88 01331
Apr. 28, 1988 [FR] France .................. 88 05656

[51] Int. Cl.⁴ ............................................ F16L 55/04
[52] U.S. Cl. ................................. 137/568; 138/30; 138/40; 60/413
[58] Field of Search .................. 137/568; 138/30, 40; 60/413, 494

[56] References Cited

U.S. PATENT DOCUMENTS 3,346,014 10/1967 Jacuzzi ...................... 137/568 X
3,718,158 2/1973 Schön ........................ 137/568 X
4,463,818 8/1984 Sonneborn ................... 60/413
4,706,930 11/1987 Lexen ......................... 60/413

FOREIGN PATENT DOCUMENTS 443724 7/1970 Australia .
2028743 12/1971 Fed. Rep. of Germany .
3631609 4/1987 Fed. Rep. of Germany .
977381 12/1964 United Kingdom .

OTHER PUBLICATIONS

HYDRAULICS & PNEUMATICS, No. 7, Jul. 1980, pp. 22 and 23, Mini-Contest Winners: Log Splitter Accumulator Unloading.

Primary Examiner—John Rivell
Attorney, Agent, or Firm—Larry J. Palguta; Ken C. Decker

[57] ABSTRACT

The invention relates to a leakage device for the depletion of a diaphragm accumulator when the vehicle so equipped is not in use. This device determines a permanent leakage of the liquid to a low-pressure reservoir with a predetermined rate of flow. According to the embodiment of the invention shown in the attached drawing, the device comprises a rod (150) mounted in the plunger (110), and the leakage path is defined between the rod (150) and a narrowed zone (131) of an axial passage (132) located inside the plunger. Preferably, the plunger (110) comprises a bore (126) and passages (127, 134) in communication with the inlet port (104) and the outlet port (106), and a core (130) received in the bore (126), the axial passage (132) being formed in the core (130), and the rod (150) being mounted in the core (130). The invention is used for the braking of motor vehicles.

17 Claims, 4 Drawing Sheets

LEAKAGE DEVICE FOR THE DRAINAGE OF A DIAPHRAGM ACCUMULATOR

In pressurized hydraulic systems, such as are found with increasing frequency in automobile vehicles because of the increasing number of accessory devices serving various purposes and/or controlling braking, pressure accumulators are provided whose object is to store a certain amount of liquid under pressure between the operating periods of the pump.

These accumulators are usually made in the form of a casing divided by a diaphragm into two chambers, one of which is closed and contains a gas under pressure and of which the other is provided with an aperture enabling it to be connected to the pressurized fluid circuit in the vicinity of the delivery side of the pump.

It has been found that, despite the care taken and the improvements made in the production of the diaphragm, the latter is slightly permeable to gases which are then gradually released into the liquid, thus entailing the risk of malfunctions in the hydraulic systems, with possibly serious consequences.

It has been found that this release of gases into the liquid is reduced to a negligible value every time the area of diaphragm in contact with the liquid is practically zero. This situation arises when the pressure of the liquid is reduced to practically zero value, that is to say close to atmospheric pressure, and the diaphragm is intimately applied against the walls of the accumulator on the liquid chamber side, so that the sole zone of contact between the diaphragm and the liquid is that of the aperture making the connection to the hydraulic circuit.

The aim of the present invention is therefore to effect this depletion of the accumulator as frequently and for as long a time as possible, particularly when the vehicle is not operating.

In Hydraulics & Pneumatics, N 7, July 80, pp. 22-23, Cleveland, Oh., U.S., is disclosed a process for emptying a diaphragm accumulator whose diaphragm is adapted to be applied against at least a part of the inside wall of the accumulator in the absence of pressure. According to this document, the accumulator is disposed in a hydraulic circuit including a low-pressure reservoir and a leak of the liquid from the circuit to the low-pressure reservoir is maintained with a predetermined rate of flow.

In this way, whenever the vehicle is not in operation, the leakage of liquid from the hydraulic circuit and the accumulator to the low-pressure reservoir will have the effect of progressively lowering the pressure in the liquid chamber of the accumulator to a value close to atmospheric pressure and of intimately applying the accumulator diaphragm against the walls of the accumulator, thus restricting the zone of contact between the liquid and the diaphragm to the zone of the aperture making the connection to the circuit.

The predetermined rate of flow of the leakage of liquid will obviously be selected to be lower than the rate of delivery of the pressurizing pump, in order not to prevent the pressurization of the liquid, and will even be substantially lower in order not to bring about too rapid a depletion of the accumulator during operation and too frequent restarting of the pump, which would result in increased consumption of energy.

The invention proposes a leakage device intended for the application of this process. According to the invention, this leakage device comprises a body provided with a chamber, an inlet aperture intended for connection to the hydraulic circuit, an outlet aperture intended for connection to the lowpressure reservoir, and a plunger mounted in the chamber, the plunger being provided with means defining a leak path between the inlet aperture and the outlet aperture.

The invention will be better understood on perusal of the following description, which is given with reference to the accompanying drawings, and in which.

Figure 1:
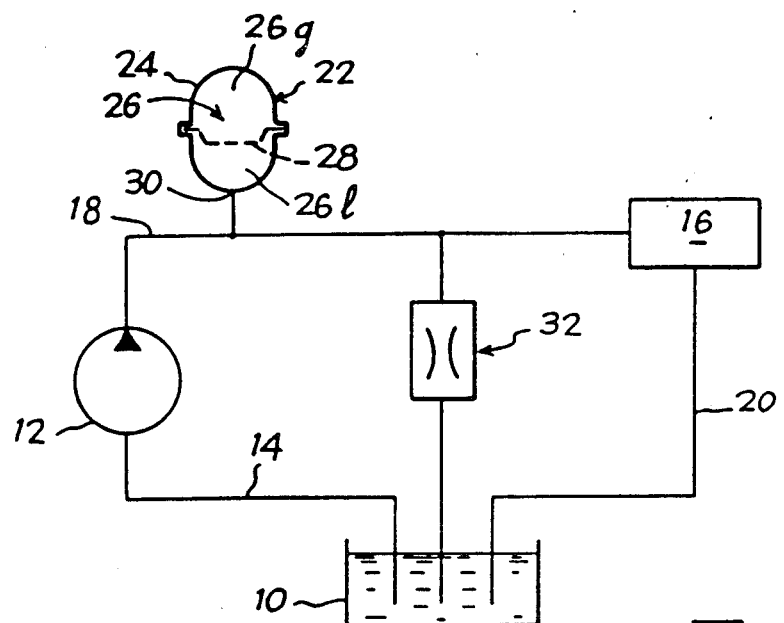
FIG. 1 shows schematically a pressurized hydraulic circuit according to the invention.

The hydraulic circuit shown schematically in FIG. 1 comprises a reservoir 10 for liquid under low pressure, for example atmospheric pressure, and a pump 12 which draws the liquid from the reservoir 10 via a pipe 14 and delivers it under high pressure towards load devices symbolized in a general way by the reference 16, via a line 18.

The load devices 16 are connected to the low-pressure reservoir by means of a return pipe 20 for the purpose of returning the liquid to this reservoir on the operation of the load devices.

As is well known, the pump is put into operation every time the pressure in the circuit falls below a minimum threshold and is stopped when the pressure exceeds a maximum threshold.

In addition, the circuit includes an accumulator 22 branched off from the delivery pipe 18 for the purpose of storing a certain amount of pressurized liquid and permitting a certain autonomy for the feeding of the load devices 16 outside the periods of operation of the pump 12.

The accumulator 22 is of the diaphragm type. A detailed description of it is not necessary and it will simply be stated in the present description that the accumulator comprises a casing 24 defining in its interior a cavity 26 subdivided into two chambers $26g$, $26l$ by a diaphragm 28.

The cavity $26g$ is filled with a gas under pressure, preferably a neutral gas such a nitrogen, for example, and the chamber $26l$ is in communication with the pipe 18 via an aperture 30.

Depending on the pressure of the liquid in the pipe 18, a certain amount of liquid penetrates into the chamber $26l$, pushing back the diaphragm 28 to a position in which the pressures of the gas and the liquid are practically equal.

When there is no pressure in the pipe 18, the diaphragm is pushed back completely towards the liquid chamber $26l$ and is applied intimately against the walls of the casing, so that contact between the diaphragm and the liquid is reduced to a zone of negligible area facing the aperture 30. Consequently, the release of the gases into the liquid will be practically prevented from doing so whenever the diaphragm is in this position.

To this end, it is provided for a constant leakage of liquid to be maintained from the pipe 18, and therefore from the accumulator 22, towards the low-pressure reservoir 10 with the aid of a leakage device 32, which is interposed between the pipe 18 and the reservoir 10.

Figure 2:
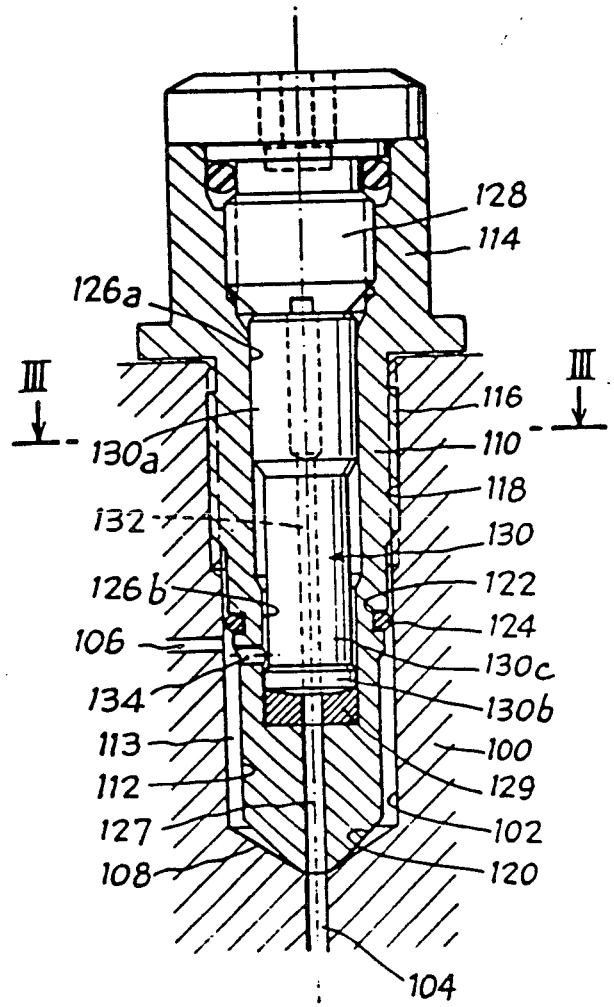
FIG. 2 is a view in section of a leakage device included in the circuit shown in FIG. 1.

In the first embodiment illustrated in section in FIG. 2, the leakage device comprises a body 100 having a blind bore 102 forming a chamber and provided with an inlet aperture 104 leading into the bottom of the bore and an outlet aperture 106 leading out laterally from the bore. A conical seat 108 is provided at the outlet of the inlet aperture 104.

In the bore 102 is mounted a plunger 110 having a cylindrical stem 112 ending in a head 114 and provided with a screwthread 116 near the head, to enable it to be screwed into an internally threaded portion 118 of the bore.

The end of the plunger 110 has a conical profile 120 which comes to bear sealingly against the conical seat 108. Between the cylindrical portion of the stem and its screwthread a peripheral groove 122 is provided to receive an O-ring 124 making a seal between the plunger and the bore beyond the outlet aperture 106.

When the plunger is unscrewed, its conical end 120 is lifted off the seat 108, thus bringing the inlet aperture 104 into free communication with the outlet aperture 106 by way of the space 113 separating the stem 112 from the bore 102. This permits the rapid release of the pressure in the pump delivery and accumulator circuit, for example when repairs are needed. As a rule, the device will be placed at the highest point in the circuit and will then also serve as a conventional drain device, and the similarity of its construction to that of the latter will be noted.

The plunger 110 is provided with means intended to maintain a permanent leakage of liquid between the inlet aperture 104 and the outlet aperture 106.

As can be seen in FIG. 2, the plunger has a stepped bore 126 consisting of a first wide portion 126a and a second narrow portion 126b leading via a passage 127 to the inlet aperture 104. The wide portion 126a of the bore is leaktightly closed at its end on the plunger head side by means of a stopper 128. A stepped cylindrical core 130, having two sections 130a, 130b separated by a narrowed portion 130c, is mounted in the stepped bore and has an axial passage 132 extending through it. The bottom section 130b of the core is applied against a seal 129 at the bottom of the lower section 126b of the bore. Finally, the core has a radial passage 134 facing the narrowed portion 130c of the core and leading into the chamber 113.

Figure 3A:
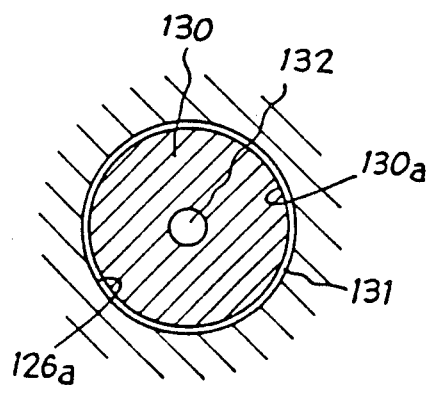
FIGS. 3a and 3b are detail views in section taken on the line 3—3 in FIG. 2 and illustrating two variant embodiments.

In a first embodiment, the portion 126a of the plunger bore and the section 130a of the cylindrical core 130 are precision machined to define between them a calibrated annular clearance 131 (FIG. 3a) through which a permanent predetermined leakage flow is established, this flow passing in succession though the inlet aperture 104, the passage 127 in the plunger, the axial passage 132 in the core, the calibrated annular clearance 131 between the core and the bore 126a, the radial passage 134 in the plunger, the chamber 113, and the outlet aperture 106.

Through appropriate choice of the diameters of the bore 126a and of the core 130a, and thus of the calibrated clearance 131, the leakage flow will be maintained at a value substantially below that of the delivery flow of the pump when the vehicle so equipped is in use, in order not to increase excessively the frequency of restarting the pump, while allowing the emptying of the pressurized circuit and of the accumulator within a reasonable time, that is to say between a few tens of minutes and several hours, when the vehicle is not in operation.

Figure 3B:
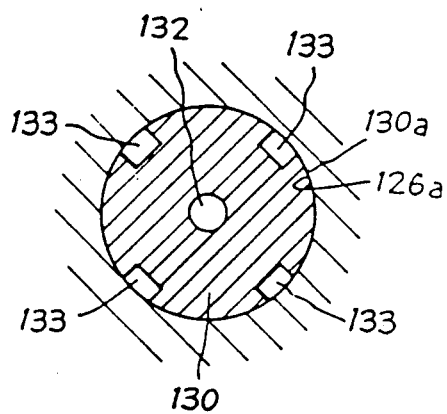

The calibrated clearance between the core 130a and the bore 126a can be arranged in different ways. As illustrated in section in FIG. 3b, the core and the bore are machined and assembled without clearance, the leakage of liquid then being achieved with the aid of one or more grooves 133 precision machined around the core, either longitudinally or helically.

In the case of an annular clearance 131 (FIG. 3a) the rate of flow of the liquid is in fact low and may result in clogging because of the impurities usually contained in the liquids used in hydraulic circuits.

In the case of grooves 133 (FIG. 3b), the section of the grooves is larger, so that inopportune clogging is avoided.

Figure 4:
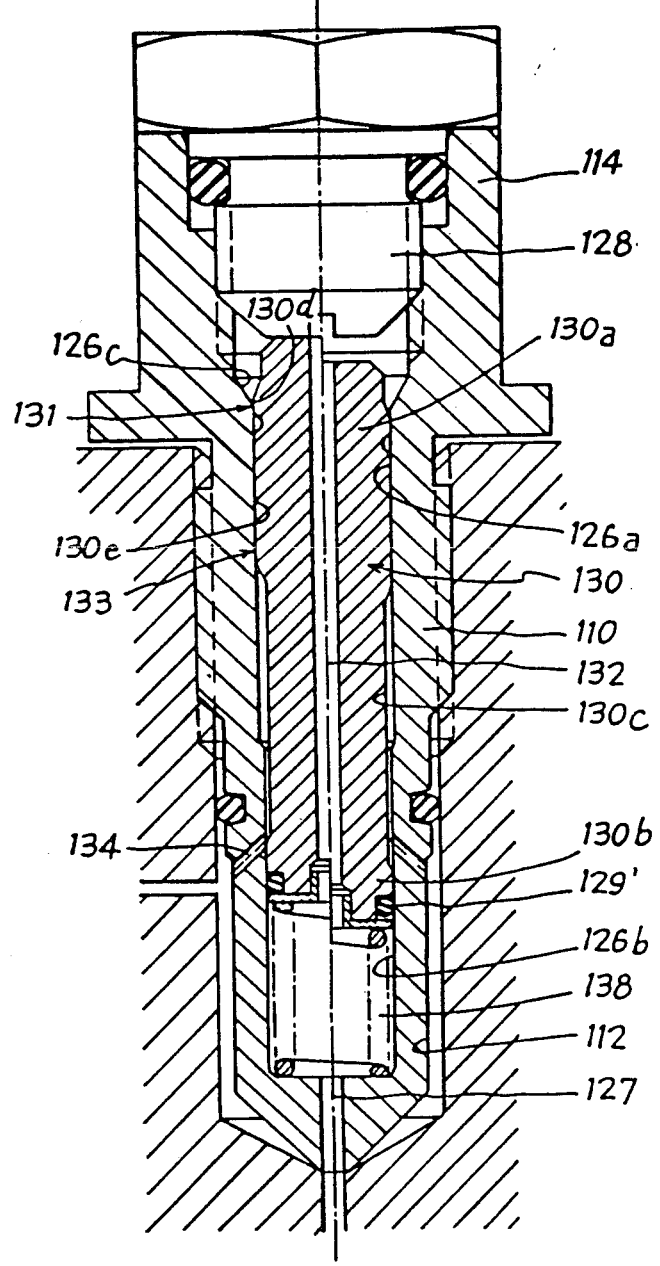
FIG. 4 is a view in section similar to that in FIG. 2 and illustrating another form of construction of the leakage device.

The second embodiment illustrated in FIG. 4 is essentially similar to the first, and the same reference numerals will be used to designate the same elements.

In this case the core 130 is mounted movably in the bore 126 instead of being mounted fixed as in the previous case. The bottom section 130b of the core is provided with a seal 129' sealing it in relation to the bottom section 126b of the bore.

A return spring 138 is interposed between the bottom of the bore 126 and the core 130 in order to push back the latter to bear against the stopper 128.

The first section 130a of the core is provided with two successive bearing surfaces, the first (130d) being precision machined in order to provide, in relation to the bore 126a, a calibrated annular clearance 131 providing leakage, while the second bearing surface 130e is received in the bore simply with the negligible clearance necessary for guidance and sliding in the bore and is provided with longitudinal grooves 133 permitting substantially a free flow of liquid in the direction of the zone of the bore situated between the two sections 126b and 126a, into which zone the radial passage 134 in the plunger leads.

Thus, when there is no pressure at the inlet aperture, the core is pushed back in the direction of the stopper 128, as illustrated on the lefthand side of the figure. When the pressure of the liquid at the inlet aperture rises, it will be observed that it generates an upwardly directed force exerted on the bottom section 130b of the core and a downwardly directed force, greater than said upwardly directed force, exerted on the top section 130a of the core.

At a certain pressure threshold the resultant force exceeds the force of the spring 138 and the core 130 is moved downwards, as illustrated in the right-hand half of the figure.

As the result of this arrangement, the bearing surface 130d of the core is periodically moved in relation to the bore 126a, thus effecting mechanical cleaning of the space separating them and thereby avoiding clogging.

According to a last feature of this embodiment, the bore 126a is provided with a bell mouth 126c close to the stopper, in such a manner that the bearing surface 130d of the core will at least partially penetrate into said bell mouth when the core is pushed back by the spring against the stopper 128. Thus, when the vehicle is stationary the initial leakage of liquid between the bearing surface 130d of the core and the bore 126a will bring about a relatively slow fall of pressure, and then, when this pressure has fallen below the threshold at which the spring starts to push the core back against the stopper, the leakage will accelerate because the bearing surface 130d moves past into the bell mouth 126c of the bore and the fall in pressure will be accelerated.

Apart from the advantage of more quickly bringing the pressure to a low value at which the diaphragm of the hydraulic circuit accumulator is quite no longer in contact with the liquid, this arrangement makes it possible to complete the mechanical cleaning of the operative leakage zone in the leak device, that is to say the calibrated clearance between the bearing surface 130d of the core and the bore section 126a, by effecting hydraulic cleaning through the "flushing" action resulting from the increased leakage flow.

Figure 5:
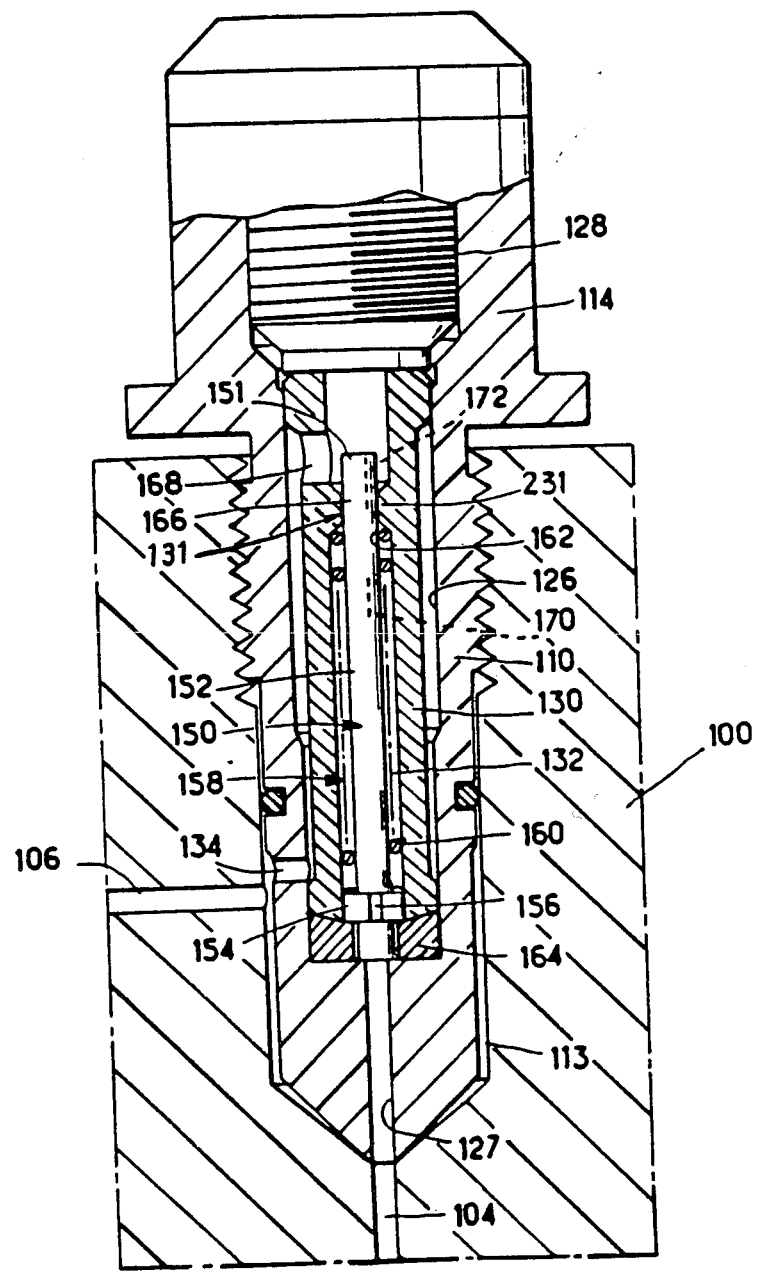
FIG. 5 is a view in section of another embodiment of the leakage device.

In reference now to the embodiment illustrated in FIG. 5, the leakage device comprises a body 100, a chamber 113 in this body, an inlet port 104 intended to be connected to a pressurized hydraulic circuit containing the diaphragm accumulator, as illustrated in FIG. 1, an outlet port 106 intended to be connected to a low-pressure tank of this same circuit, and a plunger 110 mounted in the chamber.

The plunger 110 comprises a bore 126 as well as an inlet passage 127 communicating with the inlet port 104 of the body 100, and a lateral outlet passage 134 communicating with the outlet port 106 via the chamber 113.

A core 130 is received in the bore 126 and retained at the bottom of this by means of a plug 128 screwed into the head 114 of the plunger 110. The core 130 has an axial passage 132 with a calibrated local narrowed portion 131. A cylindrical rod 150 is mounted slidably in the axial passage 132; it possesses a similarly calibrated shank 152 passing through the calibrated narrowed portion 131 of the axial passage, in such a way that a calibrated leakage clearance is defined between the shank and the narrowed portion. The calibrated clearance can be variable as a function of the stroke of the rod 152.

The cylindrical rod, at its end near the inlet port 127, 104, has a guide head 154 in the axial passage 132, this head possessing at least one lateral notch 156, allowing the fluid to pass freely from the inlet port 127, 104 towards the annular zone 158 located between the shank 152 and the axial passage 132.

A spring 160 surrounds the shank 152 and bears, on the one hand, on a shoulder 162 of the core 130 adjacent to the narrowed portion 131 and, on the other hand, under the head 154, in order to push the rod 150 in the direction of the inlet port (127, 104).

The device functions in the following way: When there is no pressure at the inlet port, the spring 160 pushes the rod 150 into the position shown in the FIG. 5, the head 154 coming up against a stop ring 164 serving moreover to ensure sealing between the plunger 110 and the core 130.

In this position, the shank 152 of the rod has a first zone 166 coinciding with the narrowed portion 131 of the axial passage of the core.

When the pressure of the fluid at the inlet port increases, this pressure is established in the inlet passage 127 and then, via the lateral notch 156 of the head 154, in the annular zone 158 between the shank of the rod and the axial passage of the core.

Because the shank 152 and the narrowed portion 131 of the core 130 are separated by a calibrated leakage clearance of small cross-section, the fluid flows off via this clearance, at the same time experiencing a considerable fall of pressure, and the shank end 151 projecting beyond the narrowed portion is subjected virtually to the pressure prevailing at the outlet port 106 (via the chamber 113, the radial passage and the bore 126 of the plunger and then the lateral passage 168 of the core).

When the force thus exerted on the rod as a result of the differential pressure on either side of the narrowed portion 131 exceeds the restoring force of the spring 160, the rod moves until it comes up against the plug 128, and the shank zone coinciding with the narrowed portion moves up to a second zone 170 represented by dots in FIG. 5.

As a result of this movement of the shank of the rod in relation to the narrowed portion of the axial passage, a mechanical scavenging of the calibrated clearance separating them takes place, thereby preventing any fouling which would eventually lead to a reduction in the leakage flow.

It will be seen that the device is especially simple to produce, since only the shank of the rod and the narrowed portion of the core require precision machining by means of customary techniques.

Finally, in order to provide a variable leakage device similar to that of the embodiment of FIG. 4, there can be a localized thinned portion 172 at the end of the shank, as represented by dots in FIG. 5, which terminates in that zone 166 of the shank located opposite the narrowed portion 131 when the rod 150 occupies its rest position. Thus, when the pressure falls below a predetermined threshold, the rod returns to its rest position under the action of the spring and the leakage of liquid accelerates.

Although in the preamble of the present description reference was made to a hydraulic circuit intended for an automobile vehicle, it will be understood that the present invention is applicable to any hydraulic circuit under pressure which includes a diaphragm accumulator.

It will also be understood that, in embodiments where the calibrated clearance is obtained by means of grooves, the latter may be provided in the bore instead of around the core.

What we claim is:

1. A leakage device in a process for emptying a diaphragm accumulator whose diaphragm is adapted to be applied against at least a part of an inside wall of the accumulator in the absence of pressure, said accumulator being disposed in a hydraulic circuit including a low-pressure reservoir, and a pump pumping liquid from the reservoir to feed a pressurized circuit including said accumulator, process according to which a leak of said liquid from said circuit to said low-pressure reservoir is maintained with a predetermined rate of flow, said leakage device, comprising a body provided with a chamber, an inlet aperture for connection to the hydraulic circuit, an outlet aperture for connection to the lowpressure reservoir, and a plunger mounted in said chamber, the plunger being provided with means defining a leak path between the inlet aperture and the outlet aperture.

2. A device according to claim 1, wherein said plunger has a bore and passages in communication with said inlet aperture and said outlet aperture, and a core received in said bore, said leak passage being provided between a section of said bore and a section of said core.

3. A device according to claim 2, wherein said section of the bore and said section of the core have precision diameters in order to maintain between them a calibrated leak clearance.

4. A device according to claim 2, wherein said section of the core is received without clearance in said bore and that the core has at least one calibrated leak groove.

5. A device according to claim 4, wherein said groove extends longitudinally along the core.

6. A device according to claim 4, wherein said groove extends helically around the core.

7. A device according to claim 4, wherein said core comprises two core sections separated by a narrowed portion and received in two stepped sections of said bore, one of the core sections being received sealingly in a corresponding section of the bore, and the other core section forming with a corresponding section of the bore said leak passage.

8. A device according to claim 7, wherein said core is mounted fixedly in the bore.

9. A device according to claim 7, wherein said core has extending axially through it a passage in communication with the inlet aperture.

10. A device according to claim 9, wherein said core is mounted in the bore for sliding between two positions and is returned by a spring to one of said positions, called the position of rest.

11. A device according to claim 10, wherein said bore has a bell mouth and said core passes at least partially into said bell mouth when it is in its position of rest.

12. A device according to claim 11, wherein said core has two contiguous bearing surfaces, one of them sliding without clearance in the bore and provided with flow grooves and the other separated from the bore by a calibrated leak clearance.

13. A device according to claim 1, wherein a rod is mounted in the plunger, and the leakage path is defined between the rod and a narrowed zone of an axial passage located inside the plunger.

14. A device according to claim 13, wherein said plunger comprises a bore and passages in communication with said inlet port and said outlet port, and a core received in said bore, said axial passage being formed in said core and said rod being mounted in said core.

15. A device according to claim 14, wherein said rod is mounted slidably in the core.

16. A device according to claim 15, wherein said rod comprises a guide head in the axial passage and a shank passing through said narrowed zone of the axial passage.

17. A device according to claim 16, wherein a spring is interposed between said head of the rod and a shoulder located inside said core and which returns the rod in the direction of the inlet port.

* * * * *